(No Model.) 2 Sheets—Sheet 1.
J. AUSTIN & R. CHAMBERLAIN.
AUTOMATIC GATE.
No. 251,498. Patented Dec. 27, 1881.
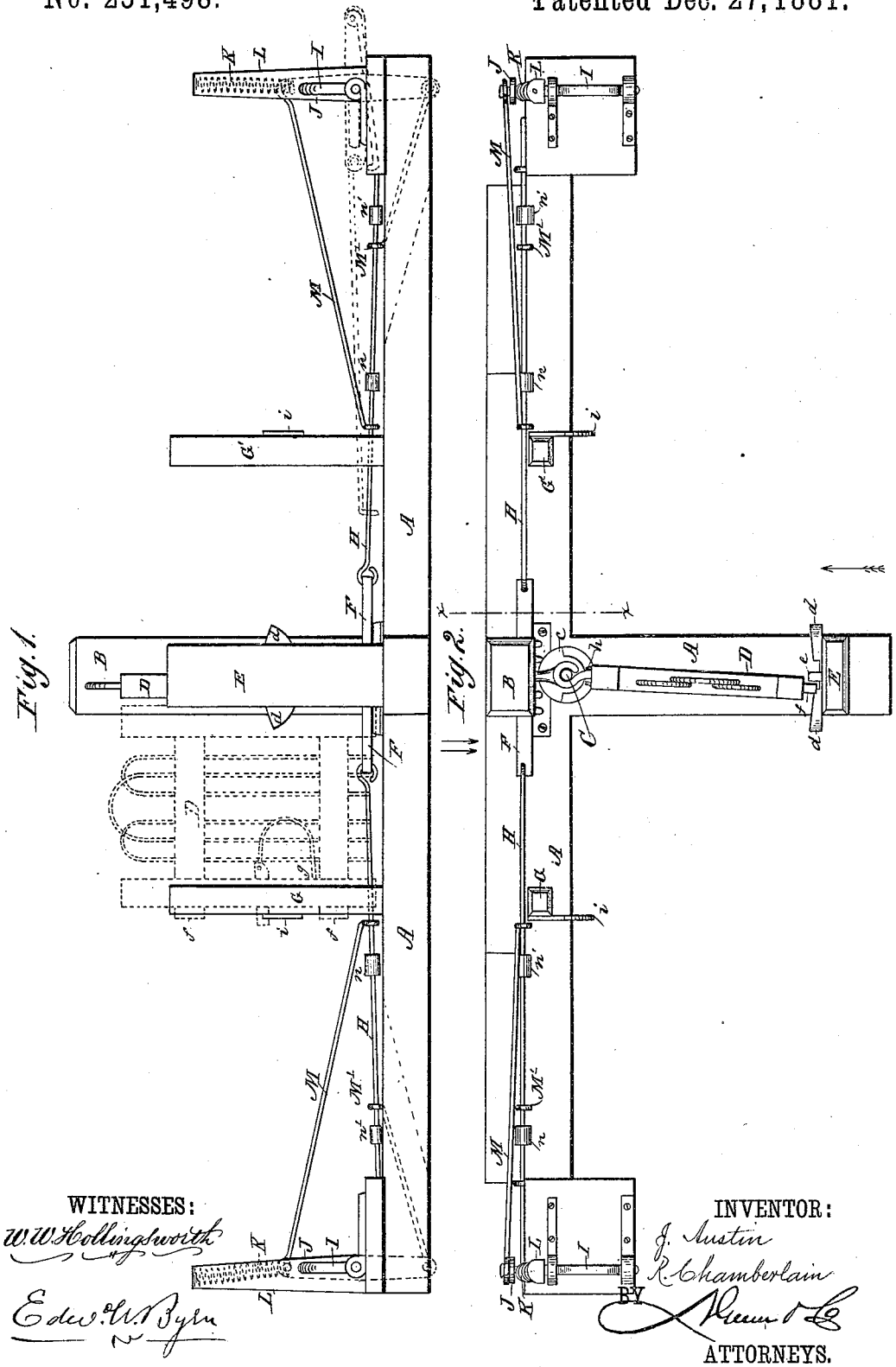
WITNESSES:
W. W. Hollingsworth
Edw. W. Byrn
INVENTOR:
J. Austin
R. Chamberlain
BY
ATTORNEYS.

(No Model.) 2 Sheets—Sheet 2.
J. AUSTIN & R. CHAMBERLAIN.
AUTOMATIC GATE.
No. 251,498. Patented Dec. 27, 1881.
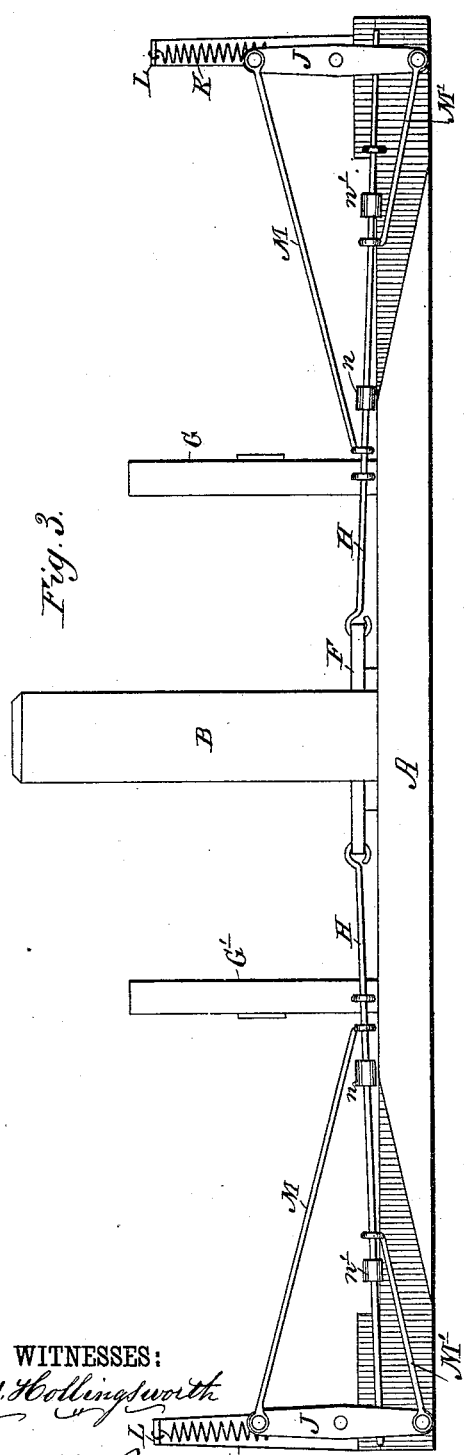
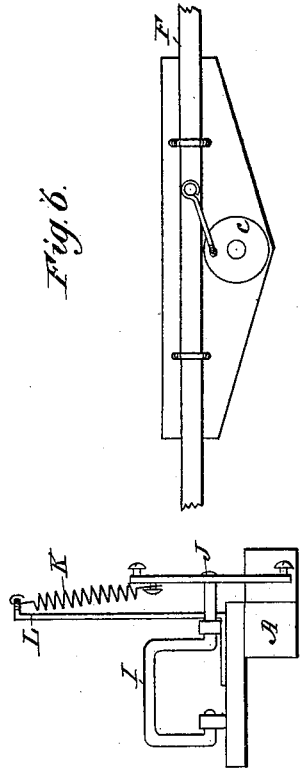
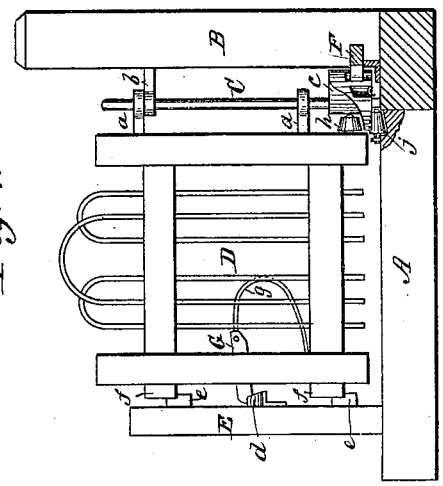
WITNESSES:
W. W. Hollingsworth
Edw. U. Byrn
INVENTOR:
J. Austin
R. Chamberlain
BY
ATTORNEYS.

UNITED STATES PATENT OFFICE.

JOSIAH AUSTIN AND ROSSCO CHAMBERLAIN, OF EAST LIBERTY, OHIO.

AUTOMATIC GATE.

SPECIFICATION forming part of Letters Patent No. 251,498, dated December 27, 1881.

Application filed November 1, 1881. (No model.)

*To all whom it may concern:*

Be it known that we, JOSIAH AUSTIN and ROSSCO CHAMBERLAIN, of East Liberty, in the county of Logan and State of Ohio, have invented a new and Improved Automatic Gate; and we do hereby declare that the following is a full, clear, and exact description of the same, reference being had to the accompanying drawings, forming part of this specification, in which—

Figure 1 is a view, looking in the direction of the single arrow in Fig. 2, and showing the gate, in dotted lines, as open or swung back. Fig. 2 is a plan view with the gate closed. Fig. 3 is a view, looking in the direction of the double arrows in Fig. 2. Fig. 4 is a side view of the gate when closed, partly in section, through line $xx$. Fig. 5 is an end view of the working crank-axle and its attachment. Fig. 6 is a modification of devices for working the gate.

Our invention has for its object to provide a gate which shall be opened and closed by the vehicle which passes through it without compelling the driver to alight. It is an improvement upon that form of automatic gate in which a toothed bar acts upon a set of segmental teeth connected with the gate-post to open or close the gate by the longitudinal movement of the sliding toothed bar, which is actuated by rods on opposite sides of the gate connected with double-cranked shafts that are struck and deflected by the vehicle-wheels.

Our improvements consist in interposing between the sliding bar and the gate a tripping-cam, which is disconnected from the gate, and serves both to lift the gate out of its latch and turn it to one side or the other.

It also consists in the peculiar arrangement of rods with lever and spring, which connect with the double-crank shaft on each side of the gate, whereby the gate is always opened and closed by a pulling action, all as hereinafter more fully described.

In the drawings, A represents the bed-frame upon which the gate and its attachments are erected. B is the main gate-post. C is a supplemental or intermediate gate-post. D is the gate, and E the latch-post.

The gate is hung upon one side by means of eyebolts $a\ a$, Fig. 4, upon the supplemental post, so as to swing thereabout as a center, and the supplemental post is itself stepped at its lower end in a bearing in frame A and at its upper end turns in an eyebolt, $b$, fixed in the main gate-post. At its lower end there is rigidly fixed a tripping and turning cam, $c$, which is provided with segmental teeth on its rear side, that mesh with teeth formed on a sliding bar, F, that is arranged horizontally near the level of the ground, and is attached on each side of the gate to the rods that work it.

Upon the latch-post E, next to the gate, is attached a catch, $d$, which has a recess in its middle, with inclined faces on each side, while above and below it are abutment blocks or stops $e$, against which projections $f$ on the gate strike, when the gate is being closed, to prevent strain on the latch.

G is the latch, which is jointed to the gate like a horizontal lever, and is arranged to work in a vertical plane. The inner end of this latch is held up by a bowed spring, $g$, so that when the gate closes the outer end of the latch moves over the inclined faces of the catch when closing in either direction and drops down into its recess.

Near the lower end of the gate, next to its hinges, is placed a friction-roller, $h$, which, when the gate is closed, rests on the lower portion of the cam $c$. Now, when it is desired to open the gate a pull is exerted on the toothed sliding bar by devices which we will describe hereinafter. This causes the cam to rotate, and as the higher portion of the same passes under the roller $h$ it lifts the gate bodily until the gate-latch is out of the catch and the projections $f$ are above the stops or abutments $e$. The gate is now free to swing, and as its roller is resting upon the higher incline of the cam, the gate in gravitating swings around to the lower portion of the cam in a direction away from the person about to pass through. To open the gate from the other side, a pull upon the sliding bar from that side produces the same effect upon the gate in an opposite direction.

To hold the gate open, posts G G' are erected on each side of the main post, and bear catches $i$, that receive the latch of the gate when it is thrown back. After the vehicle has passed through the gate a reverse movement is given to the sliding bar, and this throws the cam in the other direction, bringing its opposite high side under the roller of the gate and, lifting the latter out of the catches i, allows the gate to swing to the closed position again.

To define more positively the three positions of the gate, the cam bears upon its lower side against a friction-roller, j, and has upon its under side three notches or recesses, that correspond to the three positions of the gate, and which, by dropping over the roller j, hold the cam firmly to its place until again moved by its actuating devices.

In modifying the structure of the devices for working the gate we may lower the bottom hinge of the gate and place the friction-roller h of the gate on this hinge. We may also not use the corrugated teeth for connecting the sliding bar to the cam c, but may connect the two by a short connecting rod or link, as shown in Fig. 6.

We will now proceed to describe the means for opening the gate upon one side and closing it upon the other by the mere passage of the vehicle through.

To each end of the sliding toothed bar is attached a horizontal rod, H, which is arranged in guides on the frame A so as to have a free longitudinal movement, and which rods extend at right angles to the closed position of the gate. Near the ends of these rods, on each side, is arranged a crank-shaft, I, whose looped or cranked portion is normally held up, or in vertical position, so as to be struck and turned down by a vehicle-wheel. On the other end of this crank-shaft (on each side of the gate) is rigidly secured a lever, J, which is fastened about its middle to the shaft, and which lever, together with the bend of the crank-shaft, is held in vertical position by a spiral spring, K, attached to the top of said lever at one end and to the top of a vertical bar, L, at the other. This spring in practice we propose to house in a suitable case or tubing.

From the opposite ends of each lever J there extend pull-rods M M', both of which terminate in their ends next to the gate in eyes that loosely encircle the main rod H. Now, on these main rods are stop-blocks n n', against one of which the rod M pulls when the crank-shaft is deflected in one direction, and against the other of which the other rod, M', pulls when the crank-shaft is deflected in the other direction. Now, in operating the gate automatically by the passage of the vehicle it will be seen that when the wheels of the vehicle strike the first crank-shaft and deflect it toward the gate the lower rod, M', pulls on the stop-block n', and the toothed bar is pulled toward the vehicle and the gate opened. Then, after the vehicle passes through the gate and the wheels strike the other crank-axle and deflect it away from the gate, the upper pull-rod, M, pulls on the block n, and, pulling the toothed bar in a reversed direction, closes the gate. In passing in the opposite direction the other set of pull-rods act, and the gate opens reversely. It will be seen that as all of the strain on the toothed bar is a pulling strain the rods may be made very small, like wires; or even chains or other flexible connections might be used.

Having thus described our invention, what we claim as new is—

1. The combination, with a vertically-adjustable and horizontally-swinging gate having a friction-roller at its lower hinged end, of a cam working about a vertical center beneath said roller and a sliding bar connected with and adapted to rotate said cam for the purpose of first lifting the gate from its catches and then swinging it to one side, substantially as described.

2. The combination, with the sliding bar F, connected with and operating the gate, of a main rod, H, bearing-blocks n n', the double-crank shaft having rigid lever, and the pull-rods M M', attached to the opposite ends of the said lever and having eyes sliding on the rod H, and a spring for holding the lever and crank-shaft in vertical position, substantially as shown and described.

3. The combination, with a gate post having a double catch and stops or abutments, of a vertically-adjustable gate having projection adapted to strike said stops and provided with a spring-latch, substantially as described.

4. The cam c, having indentations on its under side corresponding to the positions of the gate, in combination with the gate having friction-rollers and a subjacent friction-roller adapted to engage with said indentations, for the purpose described.

JOSIAH AUSTIN.
ROSSCO CHAMBERLAIN.

Attest:
FRANK DEFREES,
E. J. HOWENSTINE.